(12) United States Patent
Garceau

(10) Patent No.: US 10,882,438 B2
(45) Date of Patent: Jan. 5, 2021

(54) ARCUATE SLIDE OUT DRIVE ASSEMBLY FOR ENCLOSURE

(71) Applicant: NORCO INDUSTRIES, INC., Compton, CA (US)

(72) Inventor: Bernard F. Garceau, Vandalia, MI (US)

(73) Assignee: NORCO INDUSTRIES, INC., Compton, CA (US)

( * ) Notice: Subject to any disclaimer, the term of this patent is extended or adjusted under 35 U.S.C. 154(b) by 72 days.

(21) Appl. No.: 16/384,268

(22) Filed: Apr. 15, 2019

(65) Prior Publication Data

US 2019/0241113 A1 Aug. 8, 2019

Related U.S. Application Data

(63) Continuation-in-part of application No. 15/809,496, filed on Nov. 10, 2017, now Pat. No. 10,259,374, which is a continuation of application No. 15/222,490, filed on Jul. 28, 2016, now abandoned.

(60) Provisional application No. 62/199,753, filed on Jul. 31, 2015.

(51) Int. Cl.
*B60P 3/34* (2006.01)
*F16H 35/18* (2006.01)
*F16H 19/04* (2006.01)

(52) U.S. Cl.
CPC ............... *B60P 3/34* (2013.01); *F16H 19/04* (2013.01); *F16H 35/18* (2013.01)

(58) Field of Classification Search
CPC ........................................................ B60P 3/34
USPC .............................................. 296/26.01, 26.1
See application file for complete search history.

(56) References Cited

U.S. PATENT DOCUMENTS

| | | | |
|---|---|---|---|
| 4,066,356 | A | 1/1978 | Parker |
| 5,560,667 | A | 10/1996 | Edry |
| 6,293,611 | B1 | 9/2001 | Schneider et al. |
| 6,402,216 | B1 | 6/2002 | McManus et al. |
| 2006/0082178 | A1 | 4/2006 | Rasmussen |
| 2008/0100094 | A1 | 5/2008 | MacLean |

*Primary Examiner* — Dennis H Pedder
(74) *Attorney, Agent, or Firm* — Vorys, Sater, Seymour and Pease LLP; Scott M. Guttman

(57) ABSTRACT

A drive assembly utilized in combination with slide out includes a beam attached to a beam guide in an arcuate support rail that is attached to the slide out. The beam may have a first row of teeth and a second row of teeth thereon, where the first row of teeth and the second row of teeth extend parallel to each other on opposite sides of the beam. In addition, the teeth in the first row of teeth are offset relative to the teeth in the second row of teeth. The drive assembly further includes a drive gear having a first gear wheel that engages the first row of teeth and a second gear wheel that engages the second row of teeth, as well as an actuator coupled to the beam to selectively extend and retract the beam. The beam may deflect with respect to the arcuate support rail based on its location and the location of the beam guide to aid in leveling of the slide out.

20 Claims, 16 Drawing Sheets

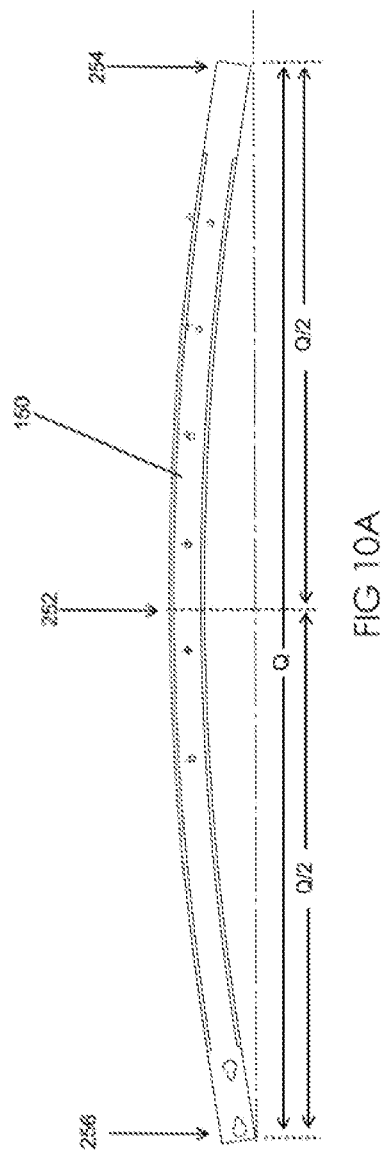

ARCUATE SLIDE OUT DRIVE ASSEMBLY FOR ENCLOSURE

This application is a continuation-in-part of U.S. application Ser. No. 15/809,496, filed Nov. 10, 2017, which is a continuation of U.S. application Ser. No. 15/222,490, filed Jul. 28, 2016, which claims the benefit of U.S. Provisional Application No. 62/199,753, filed Jul. 31, 2015, which are hereby incorporated by reference.

TECHNICAL FIELD

This disclosure relates to a slide out drive assembly for reconfiguring an enclosure and, more particularly, to an enclosure having at least one slide out that may be extended to alter the configuration of the enclosure and/or provide more room within the enclosure. Most particularly, the present disclosure relates to a drive assembly having a rack and pinion drive used to extend or retract the slide out.

BACKGROUND OF THE INVENTION

Expandable enclosures are often used in connection with recreational vehicles or trailers that have portions that extend and retract to allow the enclosure to be transported in a compact configuration and extended to a more spacious configuration when stationary. To that end, these recreational vehicles and trailers are provided with slide outs including slideable rooms and other structures that increase or reconfigure the usable space. Existing slideable rooms and other slide outs may be time consuming to install and their operating mechanisms may include components that add a great deal of weight and complexity to the enclosure. Since most enclosures having slide outs are used in applications where they need to be transported, it is desirable to reduce the weight of the enclosure as practically as possible. Likewise, reducing the complexity of the slide out drive assembly is desirable in terms of the labor needed to install the drive assembly and operation of the drive assembly by the user.

SUMMARY OF THE INVENTION

In some embodiments of the present disclosure, a drive assembly for reciprocating a slide out disposed in an opening of an enclosure between an extended position and a retracted position is disclosed. In some embodiments, the drive assembly includes a support rail defining a channel, the support rail being arcuately shaped; a beam having a front portion that is attachable to the slide out and having a guide portion opposite from the front portion that is at least partially enclosed within the channel; and an actuator coupled to the beam to selectively extend and retract the beam relative to the support rail, wherein a curvature of the support rail varies orientation of the slide out relative to the opening based on the position of the guide portion within the channel. In some examples, as the beam is extended through the support rail, the curvature of the support rail angles the beam downwards such that the guide portion of the beam is oriented higher than the front portion of the beam. In some examples, as the beam is retracted through the support rail, the curvature of the support rail angles the beam upwards such that the guide portion of the beam is oriented lower than the front portion of the beam. In some examples, the support rail includes a symmetrical or asymmetrical arcuate shape. In some examples, the drive assembly further includes a drive gear engageable with the at least one row of teeth provided on the beam, and in some of these examples, the support rail is configured to press the beam into engagement with the drive gear. In some examples, the guide portion includes a slide member configured to slide within the channel and, in some of these examples, the slide member is configured to rotate relative to the beam. In some examples, the actuator is selected from the group consisting of an electric cylinder, a hydraulic actuator, and a pneumatic actuator.

In some examples, the drive assembly further includes a drive gear engageable with the at least one row of teeth provided on the beam. In these examples, the at least one row of teeth provided on the beam may include a first row of teeth and a second row of teeth, and wherein the drive gear includes a first gear wheel engageable with the first row of teeth and a second gear wheel engageable with the second row of teeth. In some of these examples, teeth in the first row of teeth are offset relative to teeth in the second row of teeth, and wherein the first gear wheel is rotationally offset relative to the second gear wheel. In some of these examples, the support rail is configured to maintain engagement of the first and second row of teeth on the beam on the first and second gear wheels of the drive gear.

In some examples, the drive assembly further includes a drive gear connected to the support rail, and the drive gear includes a first and second gear wheel that are engageable with a first and second row of teeth provided on the beam, wherein the first and second gear wheels are mounted on a common hub. In some of these examples, the drive gear may further comprise a support wheel mounted on the common hub, the support wheel being configured to rotate independently of the common hub and engaging the beam between the first row of teeth and the second row of teeth. In some of these examples, the drive assembly further includes a stub shaft axially extending from and rigidly attached to the common hub, wherein rotation of the stub shaft imparts rotation on the first gear wheel and the second gear wheel to thereby drive the beam; and a cross member that couples the stub shaft to a second drive assembly, the cross member synchronizing the drive assembly and the second drive assembly.

In some embodiments of the present disclosure, an expandable enclosure is disclosed. The expandable enclosure may include an enclosure having an opening, a slide out provided in the opening of the enclosure, and extendable from the enclosure; and a drive assembly for extending and retracting the slide out. In some examples, the drive assembly includes a support rail defining a channel, the support rail being arcuately shaped; a beam having a front portion that is attachable to the slide out and having a guide portion opposite from the front portion that is at least partially enclosed within the channel; and an actuator coupled to the beam to selectively extend and retract the beam relative to the support rail, wherein a curvature of the support rail varies orientation of the slide out relative to the opening based on the position of the guide portion within the channel. In some examples, the enclosure is a self-powered or towable vehicle. In some examples, the actuator is selected from the group consisting of an electric cylinder, a hydraulic actuator, and a pneumatic actuator.

In some examples, the drive assembly further includes a drive gear connected to the support rail, wherein the drive gear comprises a hub; a first and second gear wheel arranged on the hub and respectively engaging a first and second row of teeth provided on the beam; a support wheel arranged on the hub and engaging the beam between the first row of teeth and the second row of teeth, the support wheel being configured to rotate independently of the hub; and a stub shaft axially extending from and rigidly attached to the hub, wherein rotation of the stub shaft imparts rotation on the first gear wheel and the second gear wheel to thereby drive the beam. In some of these examples, across member is provided that couples the stub shaft to a second drive assembly, the cross member synchronizing the drive assembly and the second drive assembly.

BRIEF DESCRIPTION OF THE DRAWINGS

FIGS. 10A to 10C are side profile views depicting various embodiments of the arcuate support rail;

DETAILED DESCRIPTION OF THE INVENTION

An "enclosure" as used herein may include any partially or completely enclosed space. The enclosure may be stationary or mobile. Mobile enclosures may be self-powered or towable, and include but are not limited to mobile homes, recreational vehicles, and trailers. The term "expandable enclosure" refers to an enclosure that has the ability to alter its configuration and in some cases create more interior space. For example, an expandable enclosure may include one or more portions that extend and retract to selectively reconfigure the space defined by the enclosure. These portions are often referred to as "slide outs" or "slideable rooms." A slide out may include a portion that is moved relative to the enclosure to change the configuration of the enclosure including but not limited to increasing the space available within the enclosure. Slide outs may be of various size and shape as required by a given enclosure. Also, slide outs may expand and retract in any known manner including, but not limited to pivoting and telescoping relative to the main portion of the enclosure. The example shown in the accompanying drawings, therefore, should not be considered limiting.

Figure 1:
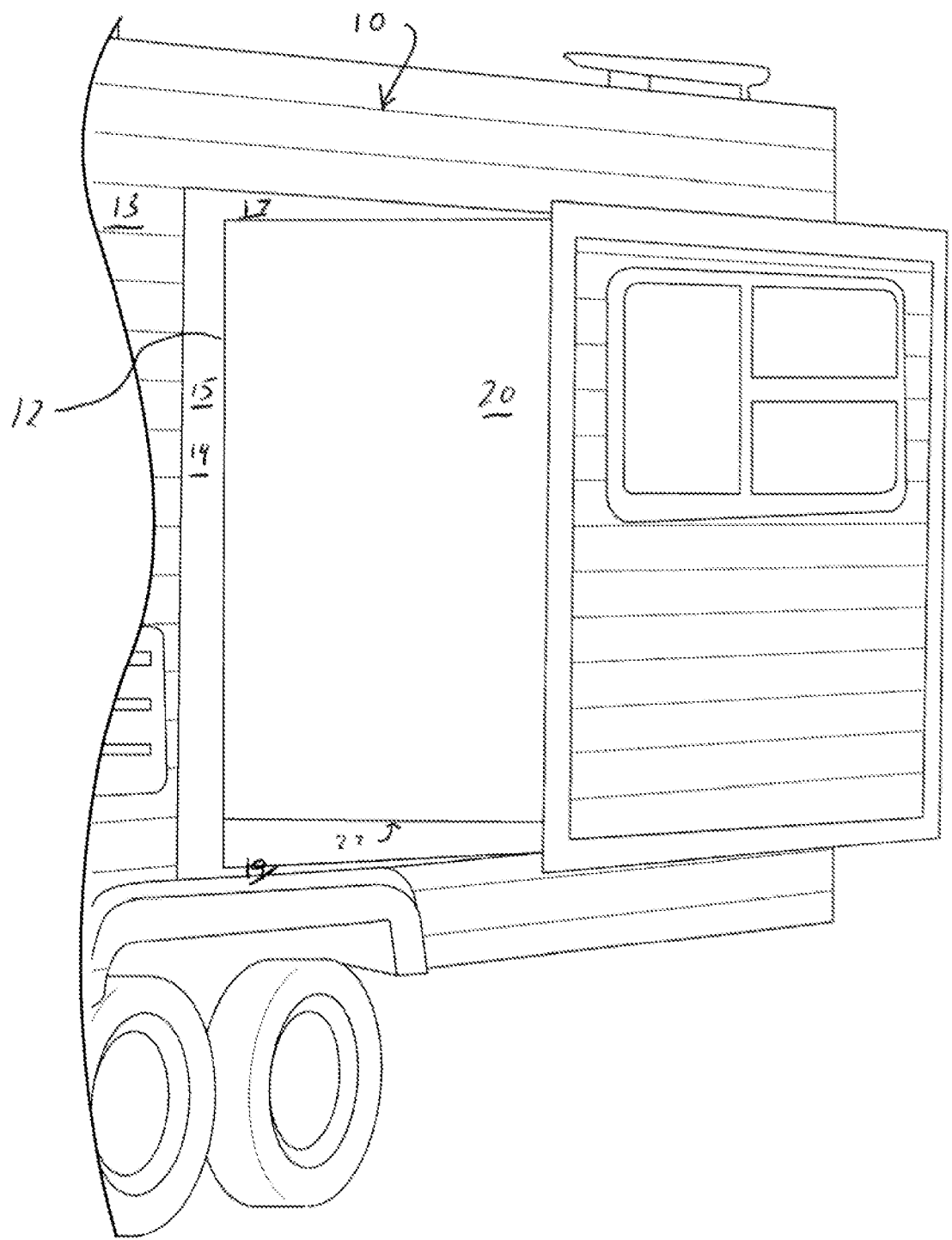
FIG. 1 is a perspective exterior view of a portion of an enclosure having a slide out according to the present invention, showing the slide out in an extended position.

FIG. 1 shows a portion of an enclosure 10 with a slide out 20 in an extended position. During movement or transport of the enclosure, the slide out 20 may be fully retracted to configure the enclosure 10 in a compact configuration. The enclosure has a wall 13 defining an opening 12 that receives slide out 20. Positioned about the edges of the opening 12 is a frame 14. Frame 14 may include side jambs 15, a header 17, and a footer 19. In the example shown, the jambs 15, header 17, and footer 19 are linear and joined at right angles to define rectangular opening 12, but other arrangements can be provided in alternative embodiments. The slide out 20 may be extended or retracted within frame 14 to alter the configuration of enclosure 10 as needed. Optionally, a seal, such as a polymer strip may be provided about the frame 14 to provide a weather tight seal between the frame 14 and the slide out 20. Slide out 20 may be of any size or shape as required by a given application and may form a compartment, dinette, wardrobe, library, bedroom, closet, kitchen, etc.

Enclosure 10 may be a self powered vehicle, such as a recreational vehicle, or may be towable, such as a trailer. The enclosure 10 may be one that is designed for living or temporary accommodation or maybe a work vehicle such as a mobile classroom, library, or temporary office space. Alternatively, the enclosure 10 may be a stationary structure including but not limited to modular housing.

As shown in at least FIGS. 2-7, a drive assembly, generally indicated by the number 50 may be mounted adjacent to the frame 14. In the example shown, drive assembly 50 is located on or below floor 22 of enclosure 10. Drive assembly 50 may include a beam 52 that attaches to slide out 20 or may form part of the frame of the slide out 20. In the example shown, an end bracket, generally indicated by the number 30, attaches to a cross member 32, which is attached to the floor 22 of slide out 20. Bracket 30 may have any shape or cross member 32 may attach directly to beam 52. In the example shown, bracket 30 includes a face plate 34 that attaches to beam 52 and to cross member 32 or slide out 20 at its top section. To provide further support for slide out 20 in the extended position, bracket 30 may include a support 36 that extends downward to contact a supporting surface. In the example shown, a telescopic support extends downwardly from the end plate and has an end that may be rotating to release and extend the support downwardly to contact the supporting surface.

Figure 4:
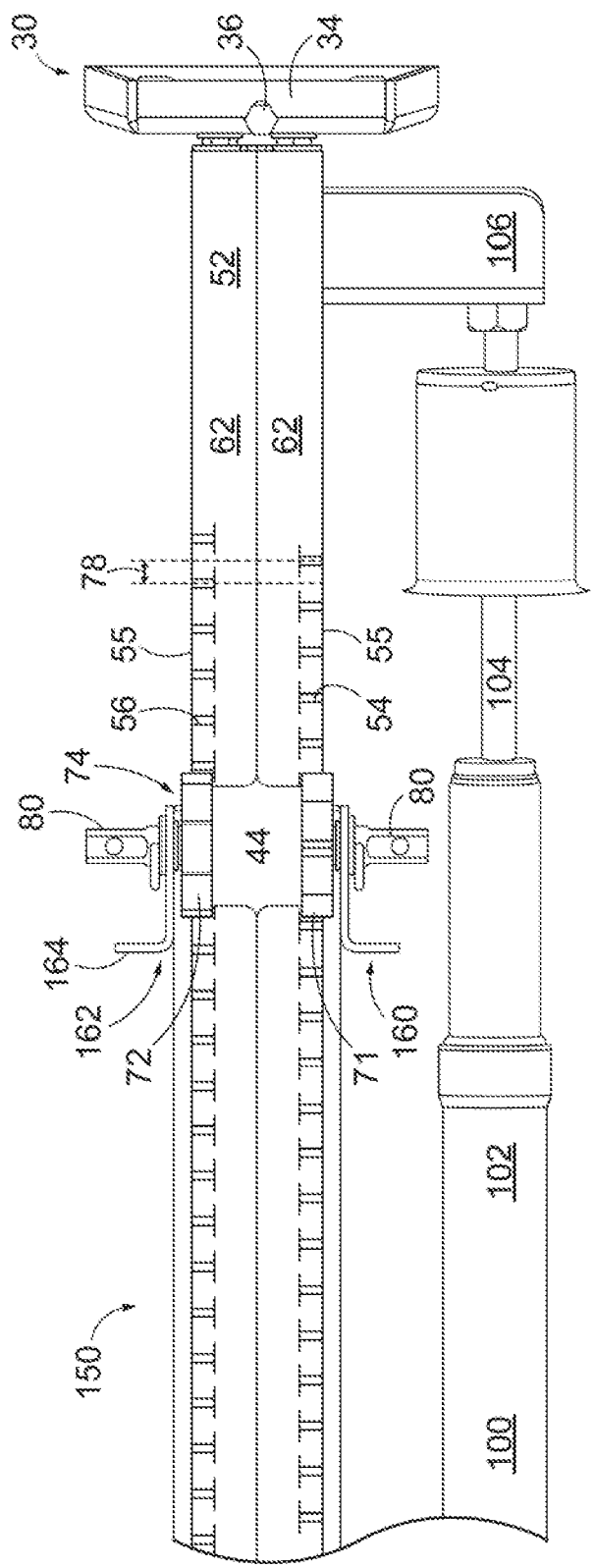
FIG. 4 is an enlarged bottom elevational view of a front portion of a drive assembly according to one or more embodiments.
Figure 5:
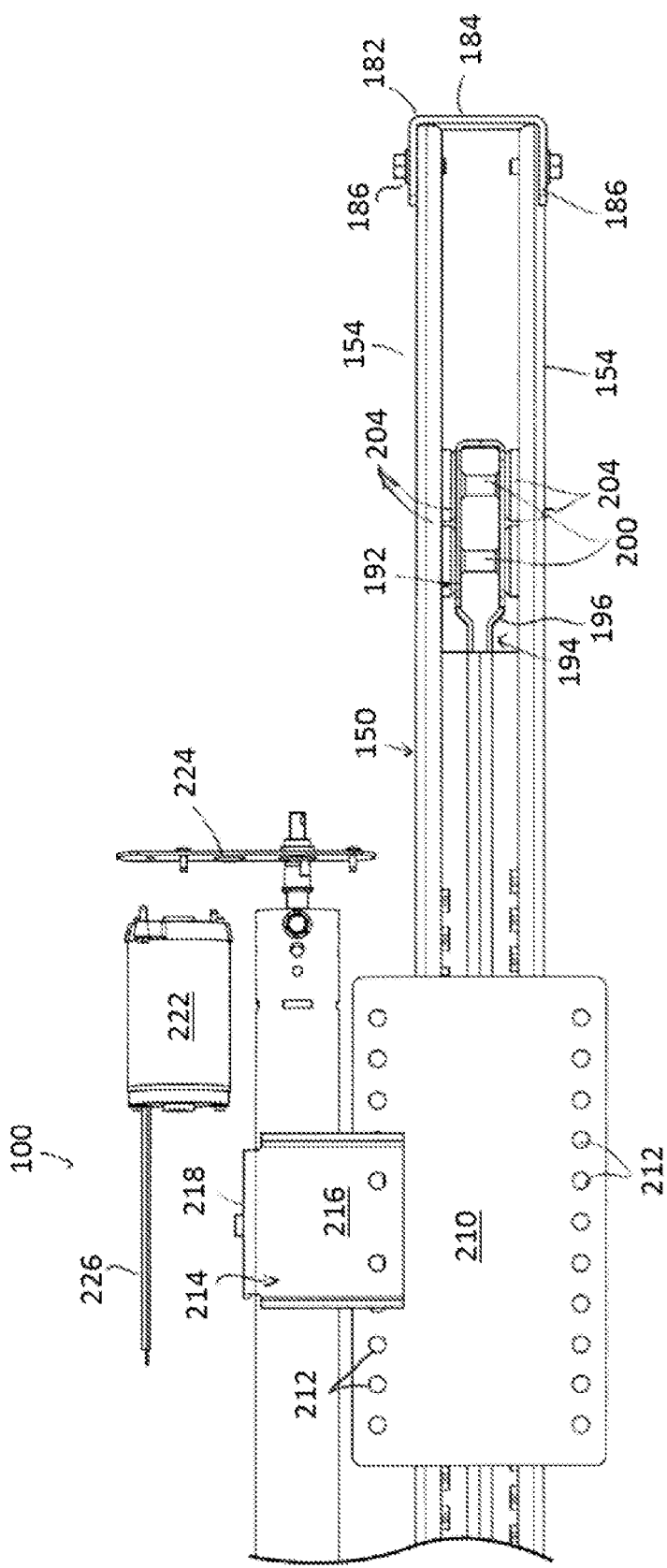
FIG. 5 is an enlarged bottom elevational view showing a rear portion of a drive assembly according to one or more embodiments.

Beam 52 is moveable between a retracted position and an extended position to selectively extend and retract slide out 20. As best shown in FIG. 4, beam 52 includes a first row of teeth 54 and a second row of teeth 56 that are formed on opposite sides of the beam 52. The first row of teeth 54 and second row of teeth 56 extend parallel to each other and, as shown, may be formed on respective flanges on either side of the beam 52. Teeth 54, 56 may be formed in any known manner. For example, the rows of teeth 54, 56 may be stamped into beam 52. The beam 52 may be a monolithic member or be formed by multiple pieces.

According to one embodiment of the invention, beam 52 is formed by a pair of c-shaped members having a vertical center section 66 and outwardly extending bottom and top flanges 62, 64. These c-shaped members are joined at the center sections and form a central channel or groove 68 where the sections are joined together. In the example shown, the rows of teeth are stamped into the bottom flange 62 of each c-shape member such that the rows of teeth 54, 56 are located on either side of the groove 68.

While aspects herein, including beam 52, describe c-shaped members, channels, or other aspects, variants including solid structures can be utilized in alternative embodiments. For example, beam 52 may instead formed by an I-shaped member or by a pair of u-shaped members. Further, different tooth arrangements, including a single row of teeth across one or more members, can be employed without deviating from the scope or spirit of the innovation.

A drive gear assembly, generally indicated by the number 70, is configured to engage the first and second rows of teeth 54, 56. Drive gear assembly 70 may include a first gear wheel 71 and a second gear wheel 72 that both engage respective rows of teeth. The drive gear assembly 70 may further include a support wheel 44 that engages beam 52 between the first and second rows of gear teeth 54, 56 to allow free movement of beam 52 in the axial direction. A support wheel 44, first gear wheel 71, and a second gear wheel 72 may all be mounted on a common hub 74. Any support wheel may optionally be mounted on suitable bearings such that it rotates independently of hub 74. In one example, a support wheel is fixed to hub 74 and rotates with first and second gear wheels 71, 72.

Alternative drives can also be utilized. In another embodiment, a belt drive 73 can be employed either to turn a drive gear assembly or other components influencing the relative position of beam 52 or other elements.

The first and second rows of teeth 54, 56 may be symmetrical about the center line of beam 52. Optionally, as shown in FIG. 4, the first row of gear teeth 54 and second row of gear teeth 56 may be offset in the axial direction with respect to each other as generally represented by numeral 78. The offset 78 between first and second rows of teeth 54, 56 may be any amount. For example, the offset 78 exemplified in the figures is one and a half teeth. This offset 78 ensures that at least one tooth on each wheel is engaged at all times thereby helping to spread the load of slide out 20. Likewise, the first gear wheel and second gear wheel 71, 72 may be mounted in corresponding rotationally offset positions to mate with the offset first and second rows of gear teeth 54, 56. In this way, greater stability is provided by maintaining contact with more than one gear tooth on either side of the beam 52 at all times.

According to another aspect of the invention, a method of forming beam 52 includes (i) stamping a first c-shaped member in a die, the first c-shaped member having a first end and a second end; and (ii) stamping a second c-shaped member in the same die, the second c-shaped member having a first end and a second end. Each c-shaped member has a bottom flange and a row of teeth formed thereon. The teeth formed on the flange each correspond to a tooth on a gear wheel as discussed above. The spacing of the cogs/teeth on gear wheels 71, 72 and on rows 54, 56 may be set such that the cogs on gear wheels 71, 72 contact the teeth in rows 54, 56 in alternating fashion. An offset between rows 54, 56 may be provided to time contact of the teeth in this alternating fashion.

The teeth in one row are offset with respect to the teeth in the second row. For example, the teeth in one row begin before the teeth in the opposite row and the teeth are spaced by an offset 78. According to one aspect of the invention a method of forming the offset teeth in a single die is provided. A single die is provided to mold or stamp one half of beam 52. The mold creates a first beam member 52 having a row of teeth 54 that start a first distance from a first end of first beam member and terminate a second distance from the second end of the first beam member. The first and second distances are not equal and differ by the amount of the desired offset 78 between the rows of teeth. That way, when a second beam member is provided by the die, the second beam member may be rotated and joined to the first beam member to create the second row of teeth 56 with the desired offset 78 between the first and second rows of teeth 54, 56.

In the example shown, beam 52 can be constructed by a pair of c-shaped beam members having rows of teeth 54, 56 formed as described above. In particular, the first c-shaped member having a first row of teeth 54 is provided, and then a second c-shaped member is placed adjacent such that its second end is adjacent to the first end of the first c-shaped member. In other words, one of the c-shaped members is flipped around and placed back to back with the other c-shaped member. Once in this configuration, the c-shaped members may be fastened or welded together to form beam 52. The fact that the rows of teeth 54, 56 each have a tooth profile that corresponds to every other tooth on a gear wheel, and the offset 78 between the rows of teeth causes alternating engagement of the teeth 54, 56 by corresponding gear wheels 71, 72. In other words, as the first gear wheel 71 moves toward disengagement of a tooth in the first row of teeth 54, the second gear wheel 72 is beginning to engage a tooth in the second row of teeth 56. In alternative embodiments, as discussed above, alternative structures distinct from a c-shaped member can be employed.

Figure 7:
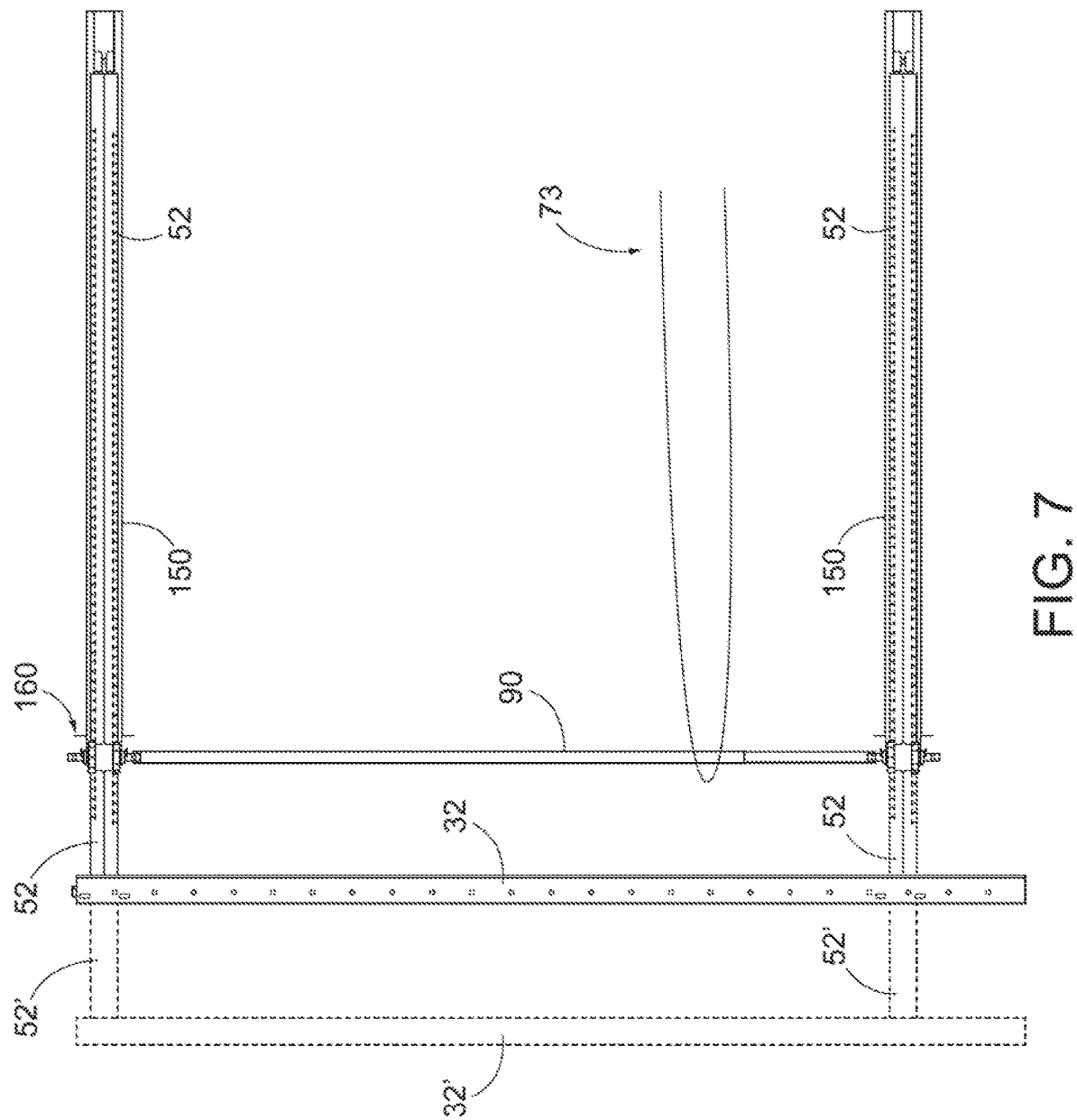
FIG. 7 is a top plan view of the drive assembly shown in FIG. 6 with the drive assembly shown in an extended position in dashed lines.
Figure 8:
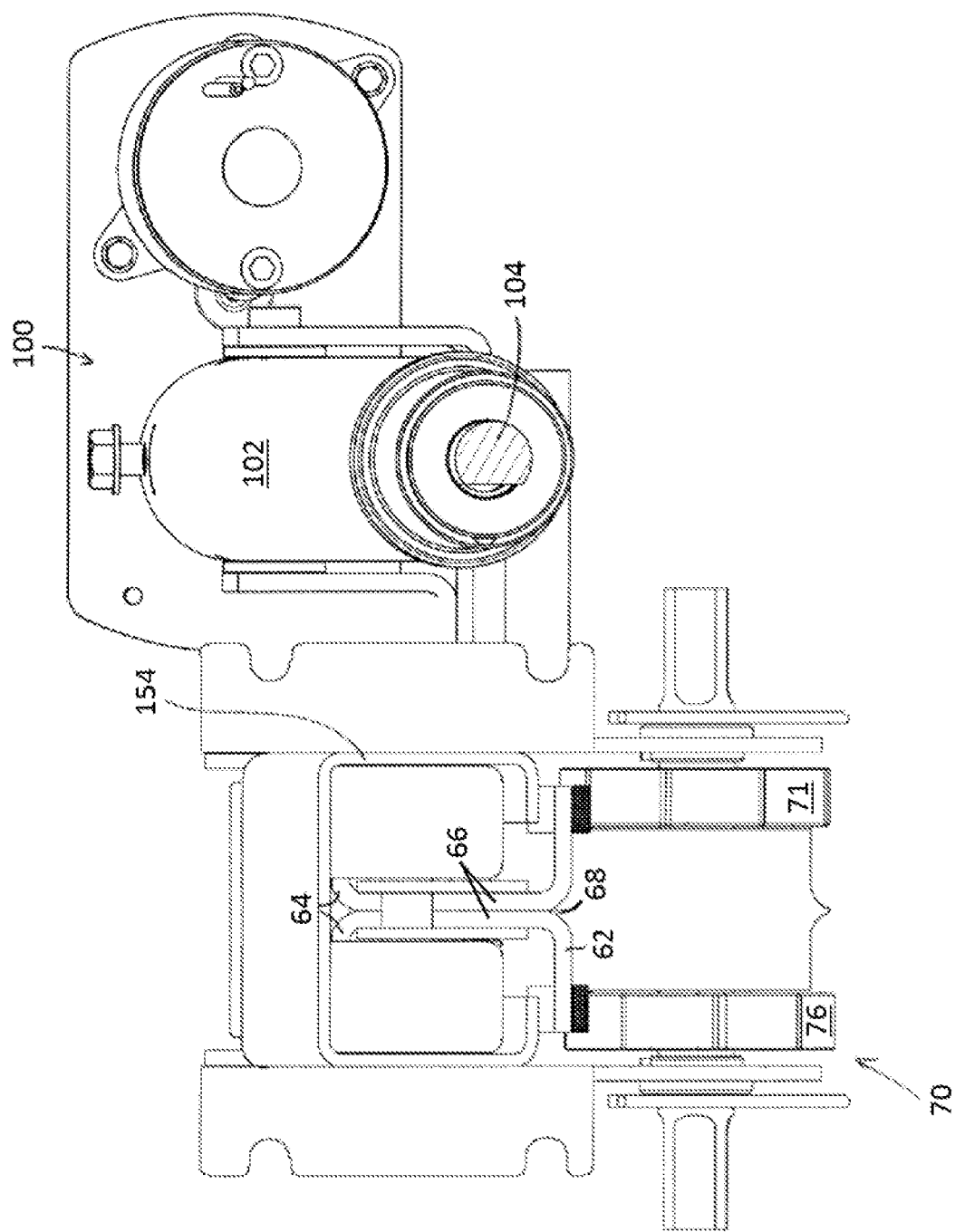
FIG. 8 is a partially sectioned front elevational view of the drive assembly depicted in FIG. 4.

In embodiments, stub shaft 80 may extend axially outward from hub 74 and is connected to hub 74 such that rotation of stub shaft 80 causes the first and second gear wheels 71, 72 to rotate and drive beam 52. The stub shaft 80 may be manually rotated with an appropriate tool or driven by a motor. As shown in FIG. 7, a motor may be coupled to stub shaft 80. A motor may be provided for each drive assembly, when using more than one drive assembly or, as shown, stub shaft 80 may also be used to link and synchronize multiple drive assemblies 50. There, a tandem drive assembly is shown having two drive assemblies 50 linked by a cross member 90 that couples stub shafts 80 extending from each hub 74. Cross member 90 may be any suitable coupler including but not limited to a telescoping square cross-sectioned tube as shown. In the example shown, tube is extended to fit over a stub shaft 80 on each drive assembly 50 and pinned in place. In this example a single motor can drive both drive assemblies 50 via cross member 90.

Figure 6:
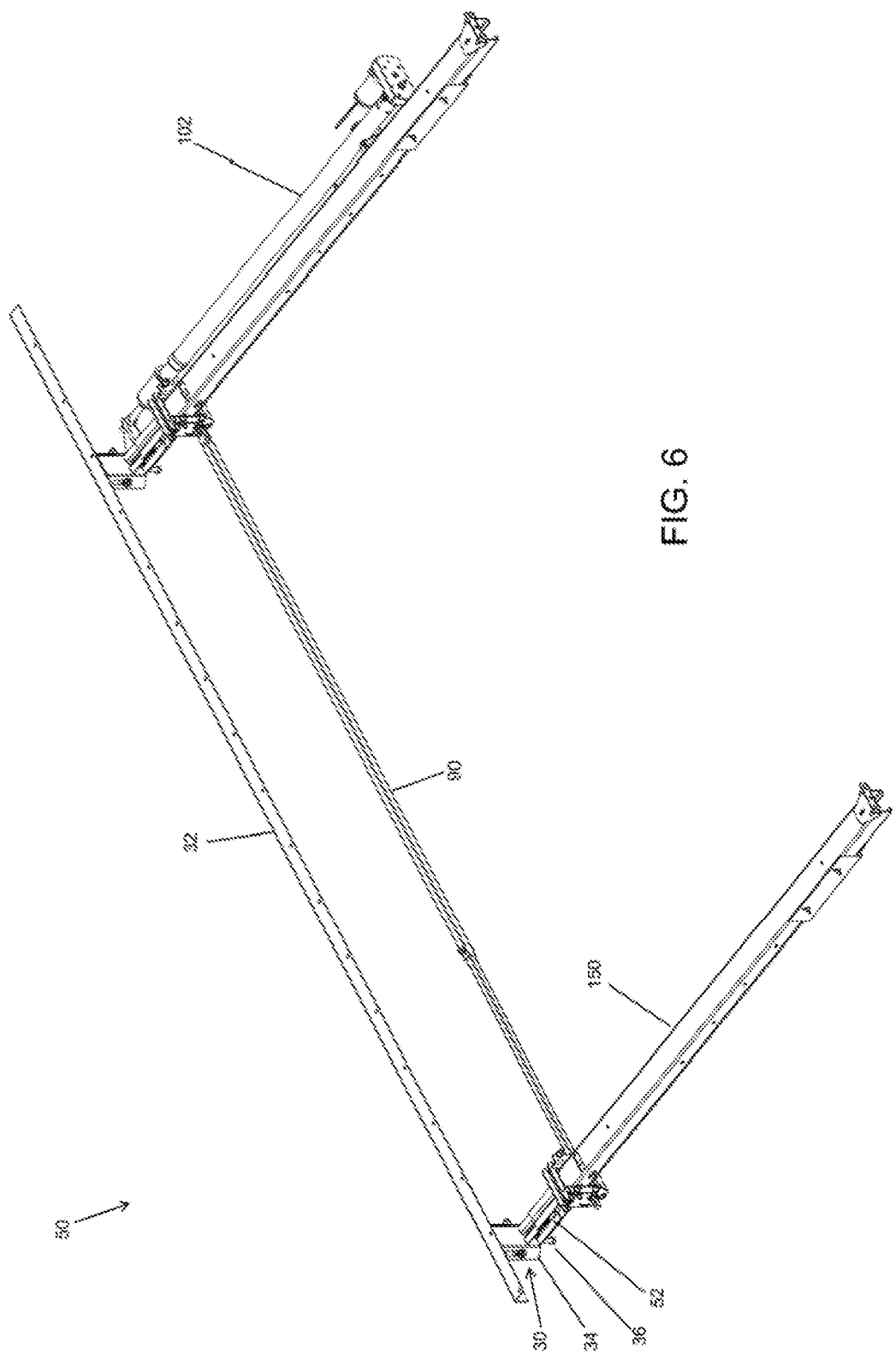
FIG. 6 is a top perspective view of a drive assembly according to another embodiment having two drive assemblies connected by a cross-member.

By coupling drive assemblies 50, a pair of beams 52 may be used to extend and retract slide out 20 through a common actuator 100. Actuator 100 may be a motor coupled to drive assembly 50 or an electric, hydraulic, or pneumatic cylinder that is coupled to a portion of drive assembly 50 to cause the beam 52 to extend and retract. In the example shown, in FIGS. 3 and 6, an electric cylinder 102 is used and has a telescoping rod 104 that attaches to an actuator bracket 106 that is coupled to beam 52 through face plate 34. In the embodiment shown in FIG. 6, the actuator 100 drives a first beam 52, which in turn causes the gear wheels 71, 72 to rotate on teeth 54, 56. Rotation of gear wheels 71, 72 rotates hub 74 and the stub shaft 80 attached thereto, which is coupled by cross member 90 to the hub 74 and stub shaft 80 of the opposite beam 52. Rotation of opposite hub 74, in turn, rotates gear wheels 71, 72 on that hub 74 to drive second beam 52 at the same time first beam 52 is driven by actuator 100. FIG. 6 depicts extension of the drive assemblies 50 to move the slide out to an extended position as shown in FIG. 1. The extended position is shown in dashed lines in FIG. 7, with the reference numerals indicated with a prime (') marking. In particular, as shown, in the extended position, actuator 100 drives beams 52 outwardly along with the cross member 32 that attaches to the slide out 20 to the extended position 52', 32'.

The drive assembly may be mounted beneath the body of the enclosure 10 or within the sub frame of the enclosure 10. Other locations may be used depending on the orientation of the drive assembly. In the example shown, a pair of substantially parallel support rails 150 are provided to house and support beams 52.

Figure 2A:
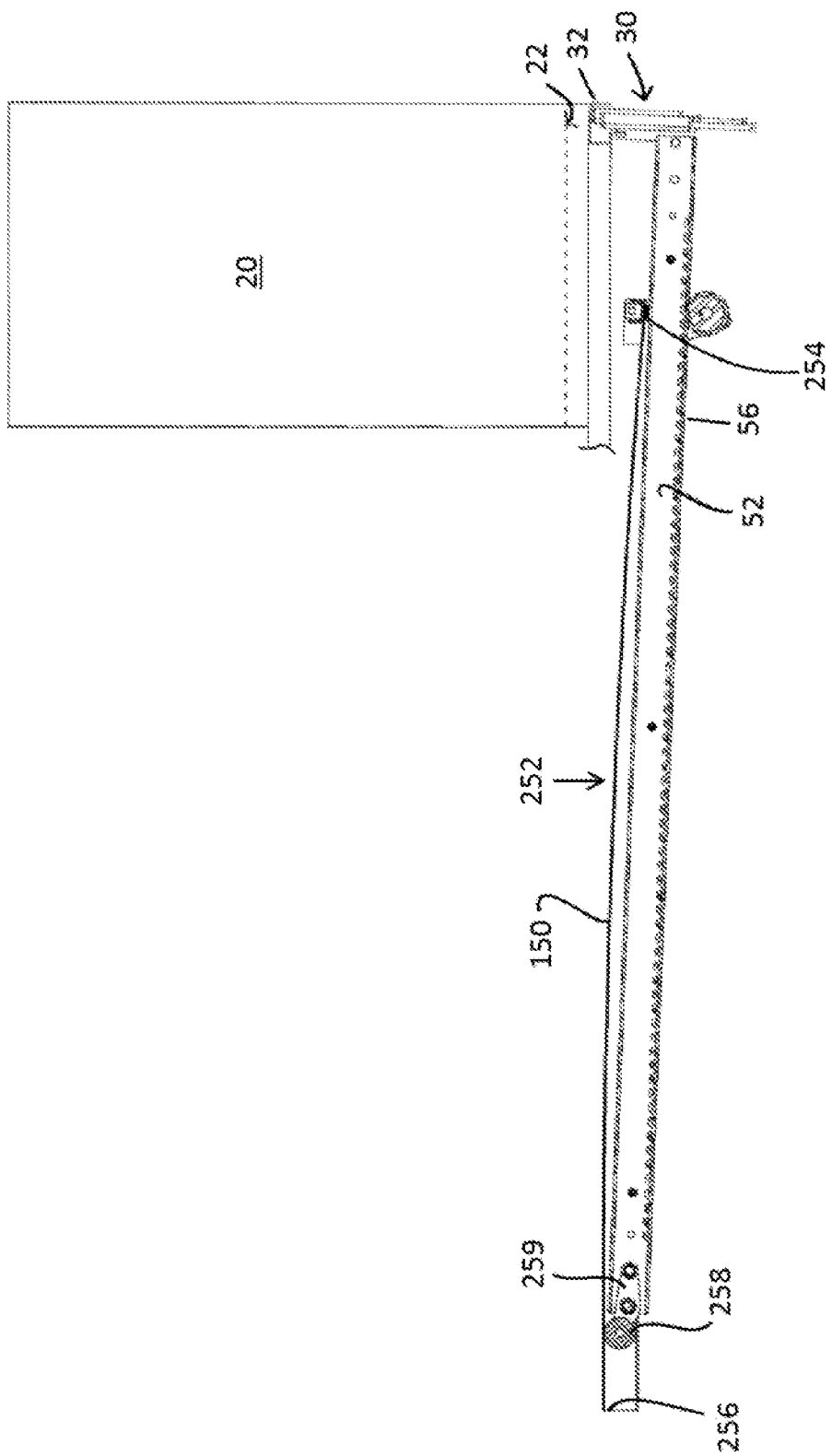
FIGS. 2A and 2B is a side elevational view of a drive assembly in a retracted and extended positions, respectively.
Figure 2B:
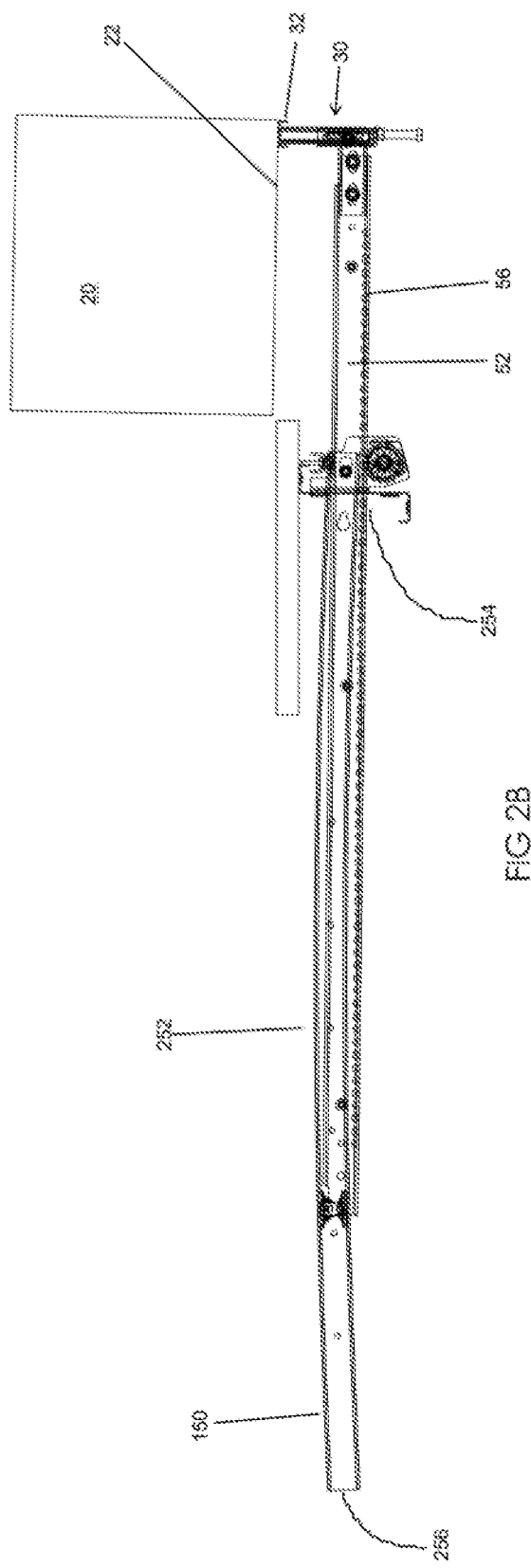
Figure 3:
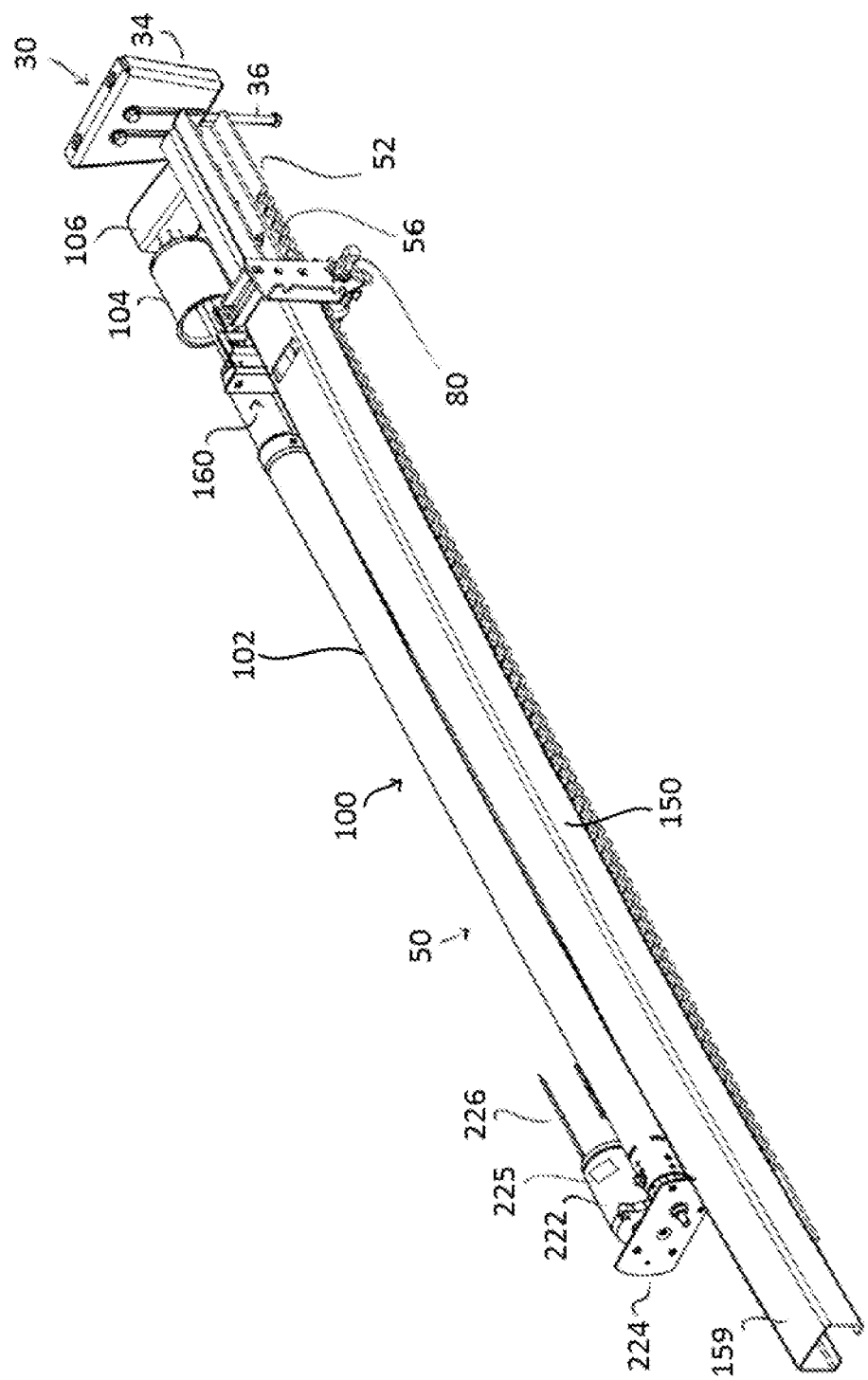
FIG. 3 is a top perspective view of a drive assembly according to one or more embodiments.
Figure 9:
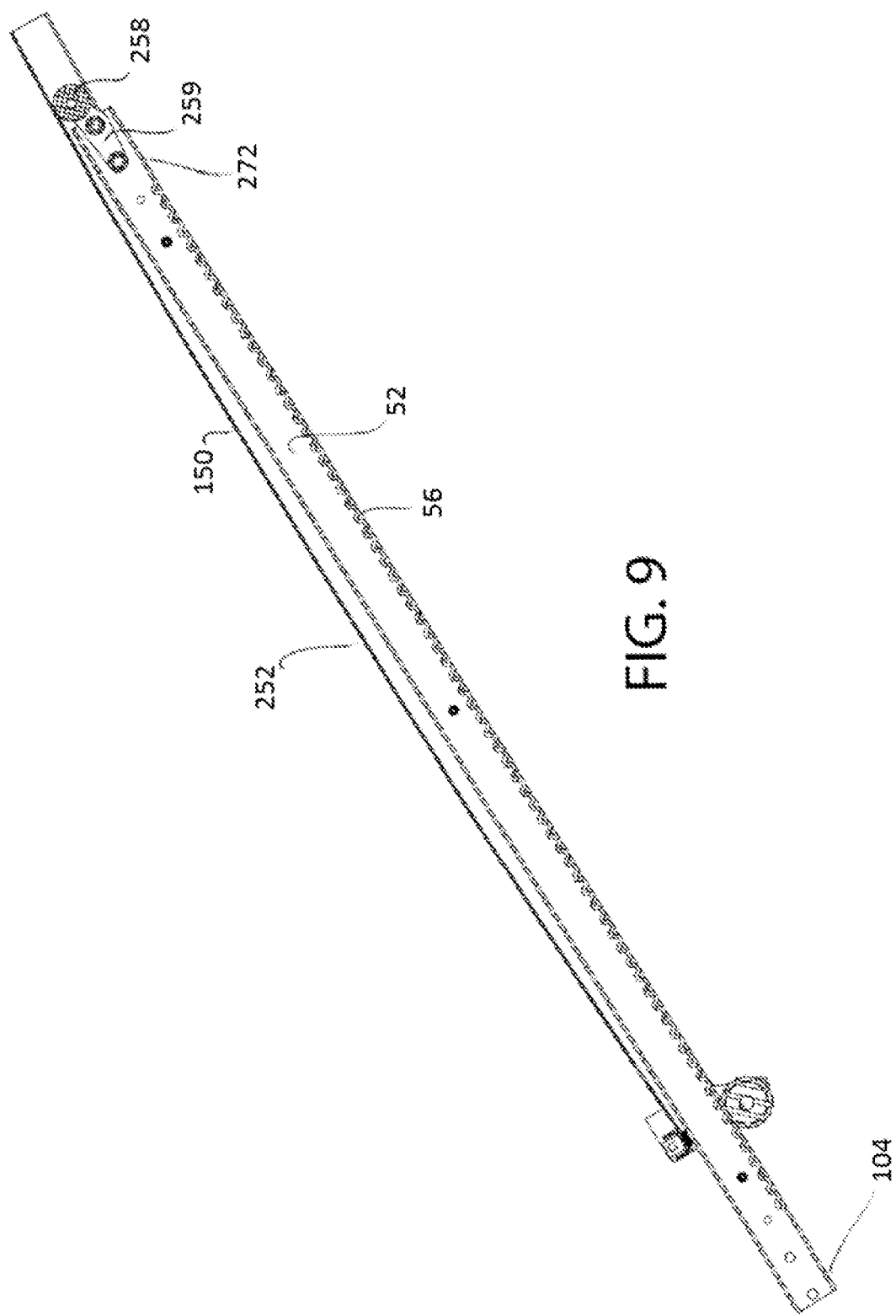
FIG. 9 is a side elevational view of a beam and arcuate support rail in accordance with aspects herein.

Each support rail 150 has an arcuate shape. As best depicted in FIGS. 2, 9 and 10, each support rail 150 has a vertex 252 between first support end 254 and second support end 256. As depicted in the Figs., the arcuate shape of support rail 150 is symmetrical. However, alternatives are contemplated herein, to include configuring vertex 252 different distances from first support end 254 and second support end 256.

In embodiments hereunder, each support rail 150 is level (to include, but not necessarily limited to, mounting each at the same height). The curvature of each support rail 150 angles beam 52 downward as it is driven through support rail 150.

Because each beam 52 may not share the curvature of support rail 150, and for example may be straight, beam guide 258 can be attached to beam 52 to retain coupling with support rail 150 where the geometry of beam 52 does not accord with that of support rail 150. Beam guide 258 can be attached in a movable fashion to permit relative movement between support rail 150 and beam 52 in two or more dimensions. In the embodiment depicted in at least FIG. 2, guide coupler 259 is arranged to rotate about beam guide 258 but is fastened in a static manner to beam 52. Here, beam guide 258 is a rolling element that matches the inner geometry of support rail 150; however, other embodiments of beam guide 258 are also embraced hereunder, to include pieces which translate through arcuate support rail(s) 150 without rotation (e.g., sliding).

In use, beam 52 is permitted to displace vertically with respect to its respective support rail 150 without becoming dislodged or stuck through interface with the inside geometry of support rail 150 and the associated beam guide 258. In this manner, as beam 52 extends, thereby deploying slide out 20, beam 52 and slide out 20 can both displace or tip opposite the direction of vertex 252 to permit leveling of slide out 20 with respect to enclosure 10.

Earlier designs using a ram and support channel typically required a reasonably loose tolerance between the ram and support channel, at times up to one eighth of one inch or more. This tolerance can create noise, wear, or other problems, including seizing between the ram and channel, and/or displacement of the ram such that the teeth of the ram gears became disengaged or slipped in relation to the teeth of the drive wheel. The disclosed arrangement using beam guide 258 permits reduction of these tolerances to eliminate the drawbacks of earlier drive solutions.

Each support rail 150 can define a channel that receives beam 52 and supports beam 52 as it extends and retracts. A stop 192 may be provided at a rear portion of a channel to adjust the length of the channel when using beams 52 of different lengths depending on the amount of extension required for a given slide out 20. The stop 192 may also be used to align beam 52 within the channel. In the example shown, stop 192 includes a yoke 194 having a pair of forwardly extending arms 196 defining a gap there between in which the center portion 66 of beam 52 is received. Stop 192 may include one or more cross bars 200 that support arms 196 and extend across a channel. As shown, cross bars 200 may be supported on rollers 204 received within each sidewall 154 of the support rail.

As discussed previously, drive assembly 50 may include an electric cylinder used to extend and retract beam 52 from support rail 150. Cylinder 102 extends parallel to beam 52 and may be supported on support rail 150, as shown. It will be appreciated that cylinder 102 may be supported on the frame of enclosure 10 or another structure as well. In the depicted example, a mounting plate 210 is attached to the support rail, as by welds. The mounting plate 210 is provided with a number of mounting holes 212 on either side to allow attachment of a cylinder bracket 214. As shown, holes 212 may be provided on both sides of mounting plate 210 to allow attachment of cylinder 102 on either side of support rail 150 depending on the location of the slide out 20. The provision of multiple mounting holes also provides flexibility for positioning the cylinder 102.

Cylinder bracket 214 may have any configuration suited for a given cylinder 102. In the example shown, cylinder bracket 214 is generally an L-shaped member with a lower leg 216 attaching to the mounting plate 210 and a pair of upstanding legs 218 that extend upward adjacent to support rail 150. In the example shown, cylinder 102 is supported between the upstanding legs 218 and secured by a suitable fastener. A motor 222 is coupled to electronic cylinder 102 and may be supported on an end plate 224 extending from one end of cylinder 102. Motor 222 may include an internal controller 225 that controls operation of motor 222. In addition, for remote operation, motor 222 may include an antenna 226. The user may operate motor 222, through a switch located within enclosure 10, or elsewhere, to selectively extend and retract slide out 20. For example, motor 222 is operated in one rotational direction to extend telescoping rod 104 at one end of cylinder 102 to extend slide out 20, and rotated in the opposite direction to retract telescoping rod 104 and, thereby, slide out 20.

Figure 10B:
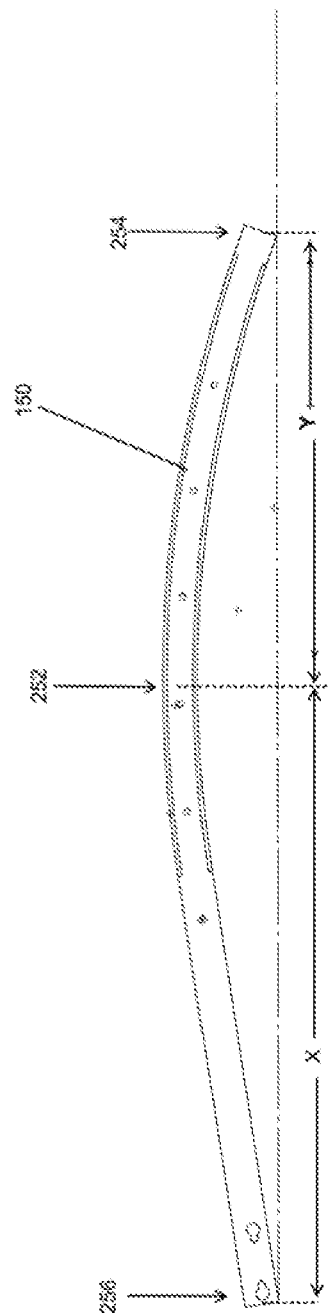
Figure 10C:
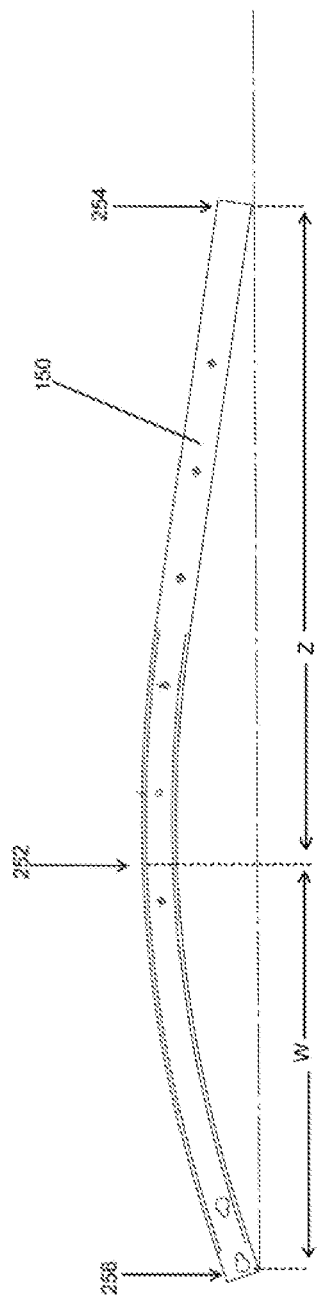

FIG. 9 illustrates another view of beam 52 and support rail 150 and provides additional detail with respect to the above-noted aspects. FIGS. 10A, 10B, and 10C illustrate alternative embodiments of an arcuate support rail 150. In FIG. 10A, support rail 150 is shown in a symmetrical curve, with the inner edge of each end 254/256 a horizontal distance of Q/2 from vertex 252 (the lengthwise/horizontal center of support rail 150). FIG. 10B shows an alternative arrangement where support beam 150 curves more sharply at end 254, thereby positioning vertex 252 closer to the same, and curves more gently toward end 256. FIG. 10C illustrates yet another alternative embodiment where support beam 150 curves more sharply at end 256, thereby positioning vertex 252 closer to the same, and curves more gently toward end 254. It will be appreciated that the curvature need not be constant at any given point on support rail 150, and may be larger or smaller in magnitude than those depicted.

As is visible in FIGS. 10A, 10B, 10C, and other drawings herein, first and second ends 254 and 256 are level with each other, or otherwise arranged at the same relative position with respect to the height and length of enclosure 10. Therefore, regardless of the curvature of arcuate support rail 150, the magnitude of incline leading to vertex 252 from the mounting point within or on enclosure 10 at which end 256 attaches is equal to magnitude of decline from vertex 252 to end 254.

While the curvature in FIGS. 10A, 10B, and 10C may be exaggerated, all curvatures and lengths are embraced according to the disclosures herein. The terminal ends and/or coupling components of support rail(s) 150 illustrated in FIGS. 10A, 10B, and 10C may be excluded for purposes of this illustration.

While support rail 150, beam 52, and other elements may be described as channels or according to specific geometries, it is understood alternatives not expressly illustrated are embraced herein. For example, support rail 150 can be any structure capable of constraining or guiding beam guide 258 in one or more dimensions as it displaces while connected to beam 52.

Figure 11:
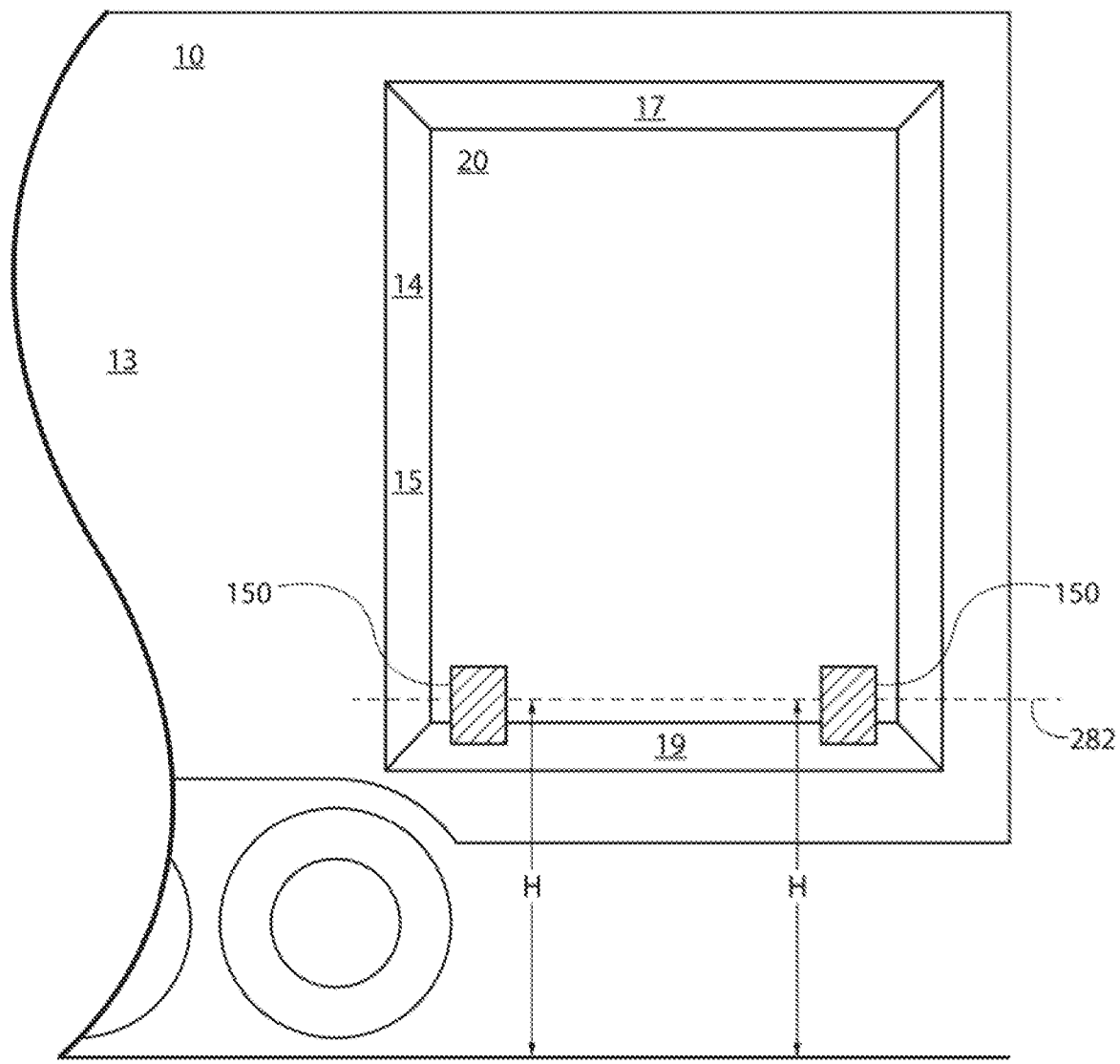
FIG. 11 is a side exterior view of a portion of an enclosure having a slide out according to the present invention, showing the slide out in a retracted position.

FIG. 11 illustrates an alternative partial view of enclosure 10, particularly showing the mounting or anchor points for each support beam 150. FIG. 11 shows that each support beam 150 is mounted within enclosure 10 at the same relative height H from level ground or any other reference (e.g., the plane represented by the dashed line 282). In this way, each support beam 150 is "level" with the others, not necessarily at all times with respect to, e.g., gravity, but at all times aligned with others with respect to the geometry of enclosure 10.

In some embodiments, the drive assembly 50 is configured to maintain engagement between the beam 52 and the drive gear assembly 70. For example, the drive assembly 50 may be configured such that the support rail 150 presses the beam 52 into engagement with the drive gear assembly 70 to ensure that the beam 52 doesn't displace upward within the support rail 150 out of engagement with the drive gear assembly 70, and/or the drive assembly 50 may be configured such that the support rail 150 maintains alignment of the beam 52 within the channel defined by the support rail 150 to ensure that the beam 52 does not slide laterally within the support rail 150 out of engagement with the drive gear assembly 70. In this manner, engagement between the beam 52 the drive gear assembly 70 will be maintained. This constant engagement will help lock the beam 52 within the support rail 150, inhibit free or unintended extension or retraction of the beam 52 relative to the support rail 150, as the actuator 100 will need to be activated to overcome the pressure applied to the beam 52 within the support rail 150.

Figure 12A:
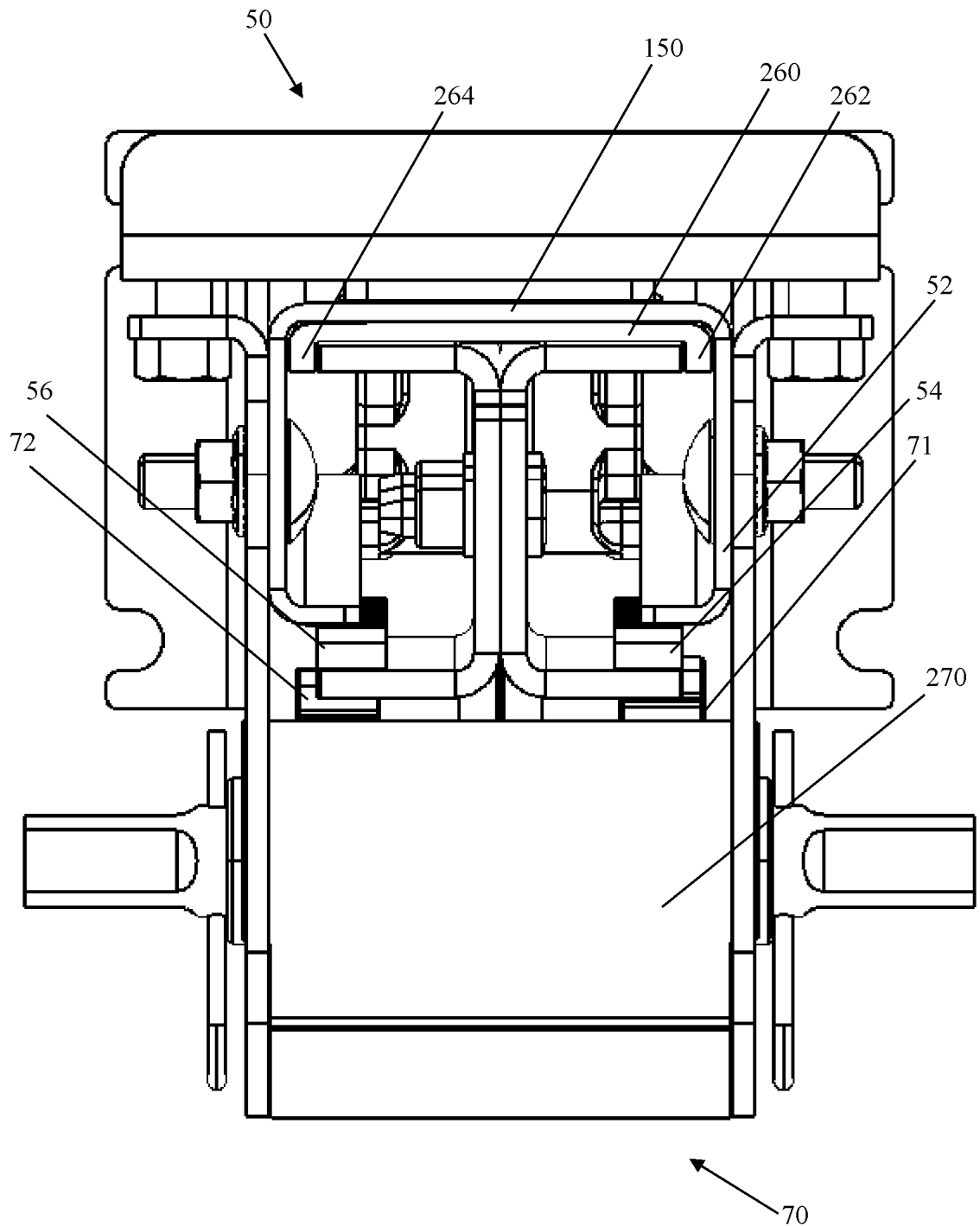
FIGS. 12A and 12B are front views of the drive assembly according to one or more embodiments.
Figure 12B:
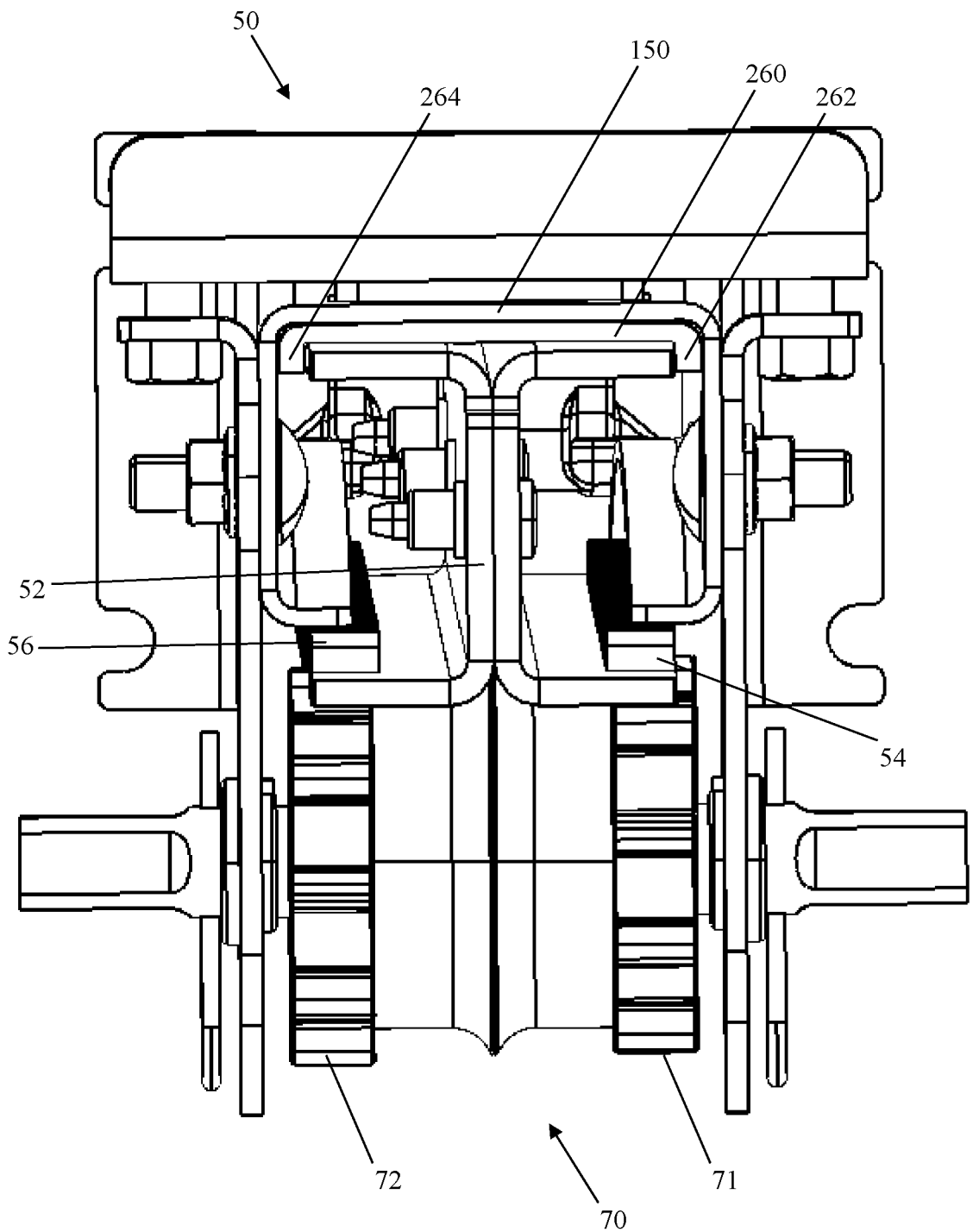

FIGS. 12A-12B illustrate an exemplary drive assembly 50 configured to maintain engagement and alignment between the beam 52 and the drive gear assembly 70, according to one or more embodiments. In the illustrated example, a pressure pad 260 is arranged on the support rail 150. Here, the pressure pad 260 extends into the channel defined by the support rail 150, and the pressure pad 260 engages and applies pressure to a top face of the beam 52 that is opposite to the bottom face of the beam 52 on which the first and second rows of teeth 54, 56 are formed. With this arrangement, the pressure pad 260 urges the first and second rows of teeth 54, 56 of the beam 52 downward into engagement with the first and second gear wheels 71, 72 of the drive gear assembly 70. The pressure pad 260 may also be configured to align (or maintain alignment of) the beam 52 laterally within the channel of the support rail 150, such that the first and second rows of teeth 54, 56 are oriented over the first and second gear wheels 71, 72. In the illustrated example, the pressure pad 260 is configured as a "C" shaped bracket such that, in addition to actively pressing the beam 52 onto the drive gear assembly 70, the beam 52 rides within the recess defined by the "C" shape of the pressure pad 260, such that the pressure pad 260 defines a path through which the beam 52 may travel as it travels within the support rail 150. Here, for example, the pressure pad 260 centers the beam 52 within the support rail 150 so that the first and second rows of teeth 54, 56 are oriented over the first and second gear wheels 71, 72, thereby inhibiting at least some lateral displacement of the beam 52 within the support rail 150 that may otherwise result in the first and second rows of teeth 54, 56 moving laterally relative to the drive gear assembly 70 into a position where they may not engage the first and second gear wheels 71, 72. Thus, in some examples, the pressure pad 260 may include a pair of flanges 262,264 that define a path within which the beam 52 travels, thereby aligning (or centering) the beam 52 within the support rail 150. The pressure pad 260 may be formed of various materials, including elastomeric materials, polymer materials, metallic materials, etc. In some examples, the pressure pad 260 is formed of a self-lubricating material; however, the pressure pad 260 may be lubricated from an external source regardless of the material from which it is formed. Also, as illustrated in FIG. 12A, a cover 270 may be provided over the drive gear assembly 70 to protect users from moving parts.

While the claimed subject matter of the present application has been described with reference to certain embodiments, it will be understood by those skilled in the art that various changes may be made and equivalents may be substituted without departing from the scope or spirit of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

The invention claimed is:

1. A drive assembly for reciprocating a slide out disposed in an opening of an enclosure between an extended position and a retracted position, the drive assembly comprising:
   a support rail defining a channel, the support rail being arcuately shaped;
   a beam having a front portion that is attachable to the slide out and having a guide portion opposite from the front portion that is at least partially enclosed within the channel; and
   an actuator coupled to the beam to selectively extend and retract the beam relative to the support rail,
   wherein a curvature of the support rail varies orientation of the slide out relative to the opening based on the position of the guide portion within the channel.

2. The drive assembly of claim 1, wherein, as the beam is extended through the support rail, the curvature of the support rail angles the beam downwards such that the guide portion of the beam is oriented higher than the front portion of the beam.

3. The drive assembly of claim 1, wherein, as the beam is retracted through the support rail, the curvature of the support rail angles the beam upwards such that the guide portion of the beam is oriented lower than the front portion of the beam.

4. The drive assembly of claim 1, wherein the support rail includes a symmetrical or asymmetrical arcuate shape.

5. The drive assembly of claim 1, further comprising a drive gear engageable with the at least one row of teeth provided on the beam.

6. The drive assembly of claim 5, wherein the support rail is configured to press the beam into engagement with the drive gear.

7. The drive assembly of claim 5, wherein the at least one row of teeth provided on the beam includes a first row of teeth and a second row of teeth, and wherein the drive gear includes a first gear wheel engageable with the first row of teeth and a second gear wheel engageable with the second row of teeth.

8. The drive assembly of claim 7, wherein teeth in the first row of teeth are offset relative to teeth in the second row of teeth, and wherein the first gear wheel is rotationally offset relative to the second gear wheel.

9. The drive assembly of claim 7, wherein the support rail is configured to maintain engagement of the first and second row of teeth on the beam on the first and second gear wheels of the drive gear.

10. The drive assembly of claim 1, wherein the guide portion includes a slide member configured to slide within the channel.

11. The drive assembly of claim 10, wherein the slide member is configured to rotate relative to the beam.

12. The drive assembly of claim 1, wherein the actuator is selected from the group consisting of an electric cylinder, a hydraulic actuator, and a pneumatic actuator.

13. The drive assembly of claim 1, further comprising a drive gear connected to the support rail, the drive gear having a first and second gear wheel that are engageable with a first and second row of teeth provided on the beam, wherein the first and second gear wheels are mounted on a common hub.

14. The drive assembly of claim 13, wherein the drive gear further comprises a support wheel mounted on the common hub, the support wheel being configured to rotate independently of the common hub and engaging the beam between the first row of teeth and the second row of teeth.

15. The drive assembly of claim 13, further comprising;
a stub shaft axially extending from and rigidly attached to the common hub, wherein rotation of the stub shaft imparts rotation on the first gear wheel and the second gear wheel to thereby drive the beam; and
a cross member that couples the stub shaft to a second drive assembly, the cross member synchronizing the drive assembly and the second drive assembly.

16. An expandable enclosure comprising:
an enclosure having an opening;
a slide out provided in the opening of the enclosure and extendable from the enclosure; and
a drive assembly for extending and retracting the slide out, the drive assembly comprising:
a support rail defining a channel, the support rail being arcuately shaped;
a beam having a front portion that is attachable to the slide out and having a guide portion opposite from the front portion that is at least partially enclosed within the channel; and
an actuator coupled to the beam to selectively extend and retract the beam relative to the support rail,
wherein a curvature of the support rail varies orientation of the slide out relative to the opening based on the position of the guide portion within the channel.

17. The expandable enclosure of claim 16, wherein the enclosure is a self-powered or towable vehicle.

18. The expandable enclosure of claim 16, wherein the actuator is selected from the group consisting of an electric cylinder, a hydraulic actuator, and a pneumatic actuator.

19. The expandable enclosure of claim 16, further comprising a drive gear connected to the support rail, wherein the drive gear comprises:
a hub;
a first and second gear wheel arranged on the hub and respectively engaging a first and second row of teeth provided on the beam;
a support wheel arranged on the hub and engaging the beam between the first row of teeth and the second row of teeth, the support wheel being configured to rotate independently of the hub; and
a stub shaft axially extending from and rigidly attached to the hub,
wherein rotation of the stub shaft imparts rotation on the first gear wheel and the second gear wheel to thereby drive the beam.

20. The expandable enclosure of claim 19, further comprising a cross member that couples the stub shaft to a second drive assembly, the cross member synchronizing the drive assembly and the second drive assembly.

* * * * *